United States Patent Office 2,760,421
Patented Aug. 28, 1956

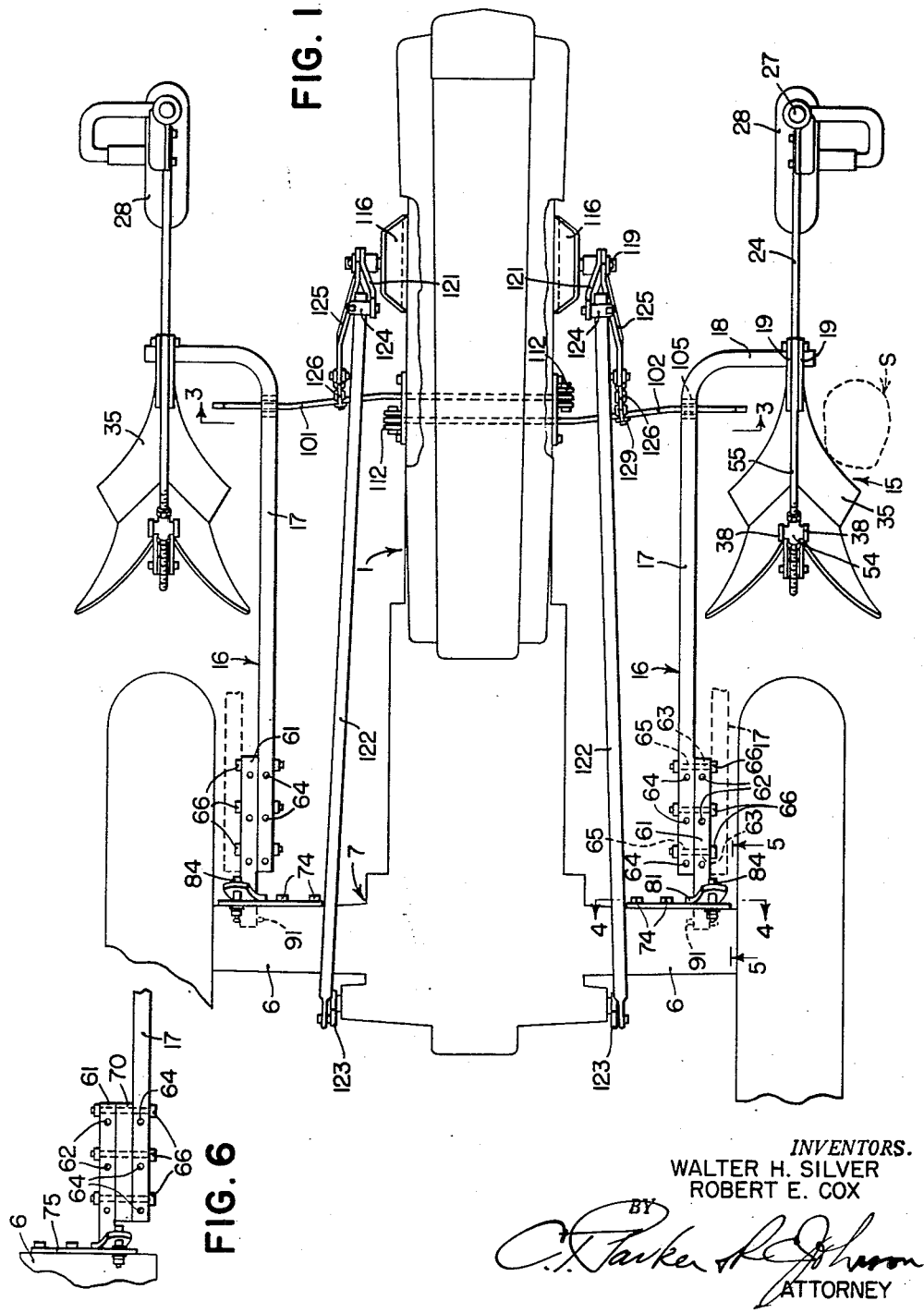

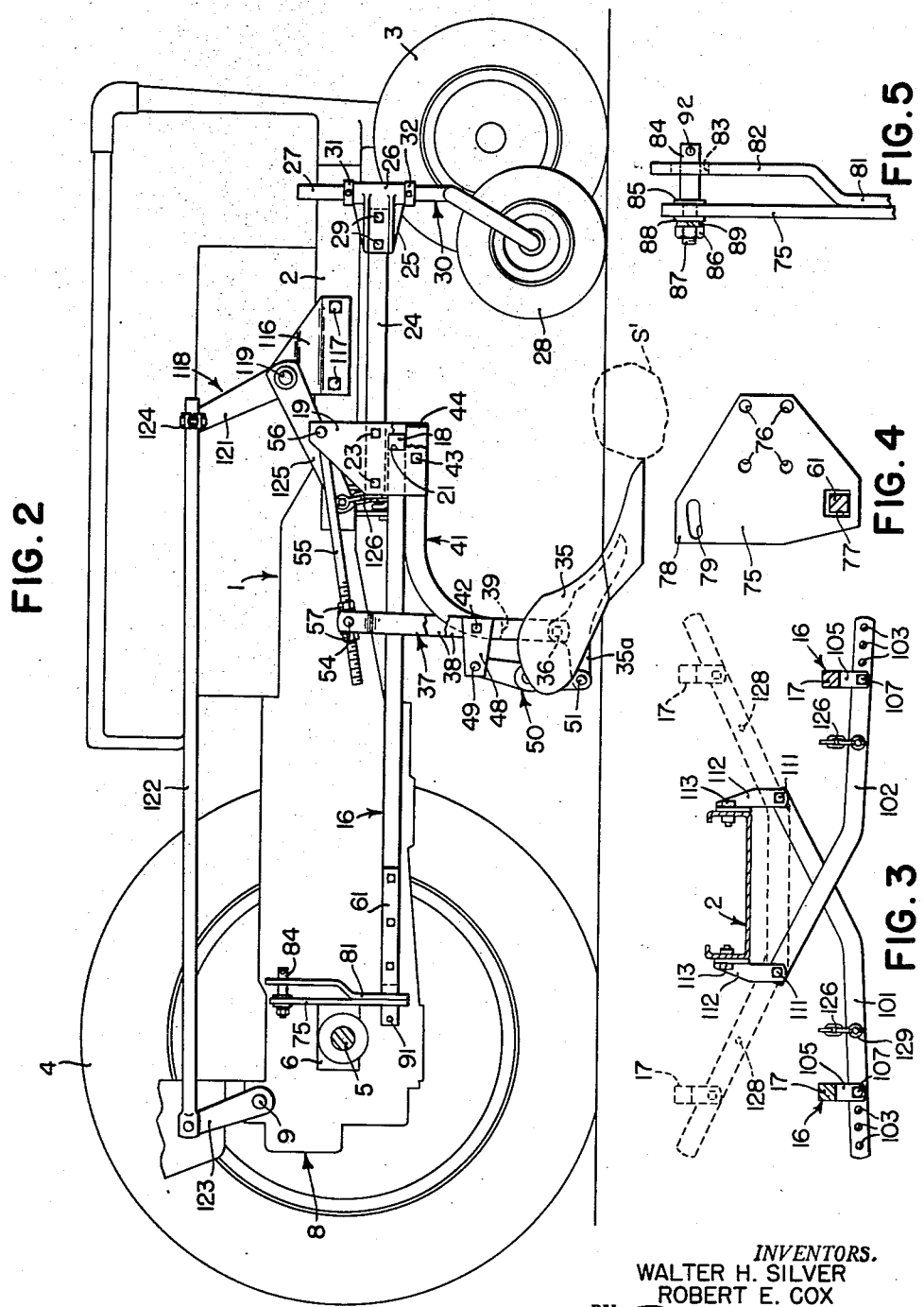

2,760,421

FRONT END BEDDER WITH OVERLOAD RELEASE

Walter H. Silver and Robert E. Cox, Moline, Ill., assignors to Deere & Company, Moline, Ill., a corporation of Illinois Original application December 1, 1950, Serial No. 198,682, now Patent No. 2,697,974, dated December 28, 1954. Divided and this application July 23, 1954, Serial No. 445,382

6 Claims. (Cl. 97—47.41)

This application is a division of our copending application Ser. No. 198,682, filed December 1, 1950, now U. S. patent 2,697,974, issued December 28, 1954. The present invention relates generally to agricultural implements and more particularly to implements of the type that is adapted to be mounted directly on a farm tractor. More particularly, the present invention relates to integral listers, bedders and the like.

The object and general nature of this invention is the provision of an integral implement, such as a lister or bedder, in which new and improved means is provided whereby the ground-engaging tool or tools may readily pass over or around an obstruction, such as a root, stone or the like, which may be encountered in operation, without damaging or overstressing any part or parts of the implement.

More specifically, it is a feature of this invention to provide an agricultural implement incorporating a generally fore and aft extending beam carrying a ground working tool in depending relation and a connection between the beam and its support, which may be a tractor or the like, so constructed and arranged as to yield under overload conditions such as may arise if one side of the tool should strike an obstruction, causing or tending to cause the beam to rock about a generally fore and aft extending axis as the tool is forced forward beyond the obstruction.

These and other objects and advantages of the present invention will be apparent to those skilled in the art after a consideration of the following detailed description, taken in conjunction with the accompanying drawings in which the preferred embodiment of the invention has been shown by way of illustration.

Figure 1 is a plan view of a tractor-mounted integral lister or bedder in which the principles of the present invention have been incorporated.

Figure 2 is a side view of the implement shown in Figure 1, the implement being shown in its operating position.

Figure 3 is a fragmentary sectional view taken generally along the line 3—3 of Figure 1.

Figure 4 is an enlarged view, taken generally along the line 4—4 of Figure 1, showing the draft connection between the right hand rear axle bracket and the rear end of the associated beam.

Figure 5 is a sectional view taken generally along the lines 5—5 of Figure 1.

Figure 6 is a fragmentary view showing the adjustable connections between the beam sections whereby different row spacing may be accommodated.

Referring first to Figures 1 and 2, the support for the implement in which the principles of the present invention has been incorporated is shown as a mobile frame in the form of a tractor of generally conventionally construction, the tractor 1 including a horizontal framework 2 supported at its front end on a pair of closely spaced front wheels 3 and a pair of laterally spaced apart drive wheels 4, each fixed adjustably to the outer end of an axle shaft 5 carried in an associated axle housing section 6, the latter sections forming a part of the rear axle structure 7 of the tractor. The latter is also provided with a power lift unit 8, which is conventional so far as the present invention is concerned, and which includes a transverse rock shaft 9 controlled by suitable valve means (not shown).

The implement in which the principles of the present invention have been incorporated is indicated in its entirety by the reference numeral 15 and includes a pair of generally fore and aft extending beams 16. The beams are substantially identical, except that one may be right hand and the other left hand, and hence a detailed description of one beam will suffice. Each beam 16 comprises a main beam section 17 which at its forward end is provided with a laterally outturned portion 18 to which a pair of vertically disposed bracket plates 19 are fixed in laterally spaced apart relation. Preferably, each of the bracket plates 19 is provided with an opening 21 receiving the outer end of the outturned beam portion 18, the latter being welded or otherwise securely fixed to the bracket plates 19. Each pair of plates 19 is apertured above the front end of the beam 16 to receive a pair of clamping bolts 23 by which the rear end of a gauge wheel supporting bar 24 is connected to the bracket plates in a position therebetween. Secured to the front end of each of the bars 24 is a casting member 25 and each of the latter is provided with a vertical sleeve section 26 to receive the vertically extending spindle portion 27 to the lower end of which a gauge wheel 28 is journaled. The front end of each bar 24 and the associated casting member 25 are apertured to receive clamping bolts 29 by which the member 25 is securely fixed to the associated bar 24. Each spindle 27 forms the upper portion of an axle member 30 the lower portion of which is extended downwardly and rearwardly whereby the associated wheels 28 caster when in operation. The vertical position of each beam 16 relative to the axle member 30 may be changed as desired, by adjusting the position of upper and lower set screw collars 31 and 32.

Each of the beams 16 carries a ground working tool in the form of a lister or plow bottom 35, the frog 35a of which, as best shown in Figure 2, is pivotally connected, as at 36, to the lower end of an associated vertical standard 37. The latter preferably comprises a pair of bars 38 suitably connected together in spaced apart relation to receive the lower end 39 of a link member 41. The end 39 is pivotally connected, as at 42, to the bars 38, and at its forward end each of the link members 41 is connected by a pivot 43 to the lower portion of the associated bracket plates 19. The forward end 44 of each link member lies underneath the laterally outturned portion 18 of the associated beam 16, these portions acting as stop means to prevent any downward swinging of the link member 41 relative to the beam 16 about the pivot 43 beyond the position shown in Figure 2.

Secured to the lower portion of each of the standard bars 38 is a rearwardly extending bracket 40. These brackets are apertured to receive a pivot 49 by which the upper end of an overload release toggle device 50 is connected therewith. The lower end of the toggle device 50 is connected by a pivot 51 to the rear portion of the associated frog 35a. The present invention is not particularly concerned with the details of the toggle trip unit 50, the same being substantially like the unit shown in the United States Patent to Cantral 2,337,026, issued December 21, 1943, to which reference may be made if necessary. The upper ends of the standard bars 38 are offset laterally to provide space therebetween to receive a trunnion member 54 through which the rear threaded end of an upper link 55 is extended, the forward end of the link member 55 being connected by a pivot 56 with the upper portion of the associated bracket plates 19. A pair of lock nuts 57 are provided so as to adjustably fix the trunnion member 54 to the rear portion of the associated link member 55.

The rear end of each of the beams 16 is formed by an auxiliary beam section 61. Each of these members is provided with a plurality of vertical apertures 62 and a similar series of horizontal apertures 63. Likewise, the rear end of each of the beam sections 17 is provided with a series of vertical apertures 64 and a series of horizontal apertures 65. Two or more bolts 66 are provided for the purpose of securely connecting the main and auxiliary beam sections in different optional positions, depending upon the row spacing desired or necessary to be accommodated between the two ground working tools 35. If the rows are fairly close together the bolts 66 are extended through the horizontal apertures 63 and 65, with the rear end of each beam section 17 at the lateral inner side of the associated auxiliary beam section 61. If a slightly greater row spacing is desired between the tools 35, the rear ends of the beam sections 17 may be disposed vertically above (or below) the auxiliary beam sections 61 and the bolts 66 inserted through the vertical apertures 62 and 64, and if a still wider row spacing is to be accommodated, the beam sections 17 may be bolted to the laterally outer sides of the associated auxiliary beam sections 61, as shown in dotted lines in Figure 1, the bolts 66 in this case being inserted through the horizontal holes 63 and 65. If a still greater row spacing is desired we provide a spacer bar 70 (Figure 6), which is apertured to receive the bolts 66, and dispose the same between the auxiliary beam section 61 and the associated beam section 17 spaced laterally outwardly from the section 61. If a very narrow row spacing is to be accommodated, the spacer bar 70 may be bolted between the beam sections 17 and 61 at the laterally inner side of the auxiliary beam section.

The rear end of each of the tool beams 16 is connected in draft-transmitting relation with the rear axle structure of the tractor by means which provides for rocking movement of each beam relative to the associated bracket about a generally fore and aft extending axis in the event the associated tool 35 should strike an obstruction at one side or the other of the tool. Such overload release and draft-transmitting structure will now be described.

Secured to each rear axle housing section 6 of the tractor is a draft bracket 75 which preferably is in the form of a relatively heavy plate having four apertures 76 to receive the four studs 74 with which each axle housing section 6 is provided at its forward side. Each bracket plate 75 is generally triangular in configuration and includes a lower opening 77 which loosely receives the rear portion of the associated beam section 61, there being sufficient looseness to accommodate a limited rotation of the beam section 61 therein and also a generally vertical swinging of the associated beam 16. The upper portion 78 of each draft bracket is provided with an elongated slot 79 which is formed so as to be arcuate about the aperture 77 as a center. An arm 81 is fixed, as by welding, to the rear portion of each beam section 61, and its upper end is offset forwardly, as at 82, to provide the clearance between the upper end of the arm 81 and the bracket plate 75 to accommodate the aforesaid vertical swinging of the beam 16. The forwardly offset portion 82 is apertured, as at 83, to receive an elongated pin or stud 84. The rear portion of the stud 84 carries a washer or ring 85 welded thereto and rearwardly of the washer or ring 85 the pin or stud 84 is reduced in diameter and threaded to receive a clamping nut 86. The reduced end, which is indicated at 87, of the pin or stud 84 is adapted to pass through the slot 79 in the associated bracket plate and to receive a thrust washer 88 and a lock washer 89 between the draft bracket 75 and the clamping nut 86. The nut 86 on each of the studs or pins 84 is tightened an amount sufficient to prevent the stud 84 from shifting in the slot 79 under normal loads. However, if, for example one of the plow bottoms 35 should encounter a large stone indicated in dotted lines on Figure 1, lying at one side of the tool 35, the laterally directed forces arising by virtue of contact between the rearwardly and outwardly extending edges of the plow bottom 35 and the stone S will cause the arm 81 to shift the pin or stud 84 laterally in order to permit the beam 16 to rock about its longitudinal axis so that the bottom may pass by the stone S without being damaged thereby or over-stressing any other part of the implement. The rear end of each auxiliary beam section 61 is apertured to receive a pin or cotter 91 and the forward end of each pin or stud 84 is apertured to receive a similar pin or cotter 92. By virtue of the parts 91 and 92 the beams 16 remain connected with the tractor even though the latter should be backed.

The front portions of the beams 16 are stabilized and connected with the tractor 1 to move vertically relative thereto, but not laterally, by a pair of overlapping link members 101 and 102. As best shown in Figure 3, the inner end portions of these link members are arranged in overlapping relation and the outer ends are apertured as shown at 103. A bracket 105 is fixed by any suitable way with the forward portion of the associated beam section 17, preferably at the underside thereof, and each bracket 105 is apertured to receive bolt means 107. This bolt 107 may be disposed in any of the associated holes 103, depending upon the row spacing desired. The inner end of each of the stabilizing links 101 and 102 is apertured to receive a pivot or bolt 111 which is carried by a bracket 112 connected, as at 113, to the side of the tractor. It will be noted that, for example, the left hand link member 101 (Figure 1) is connected at its inner end with the bracket 112 at the right hand side of the tractor.

For raising and lowering the beams 16 into and out of their transport positions we provide a pair of brackets 116 attachable, as by bolts 117, to the side of the tractor. A bell crank 118 is pivotally mounted on a laterally outwardly extending stud 119 carried by the associated bracket. The upwardly extending arm 121 of each bell crank 118 is connected by a rearwardly extending bar 122 with an arm 123 connected with the end of the power lift rock shaft 9 at that side of the tractor. The front end of each bar 122 is pivotally connected to the associated bell crank arm 121 by an adjustable pivot member 124. The other arm 125 of each bell crank 118 is connected by a chain 126 with the associated stabilizing link 101 or 102, the latter being apertured, as at 128 (Figure 3) to receive a clevis 129 by which a chain is connected to its stabilizing link.

The operation of the implement described above is substantially as follows. The tools are brought into operating position (Figure 2) by actuating the power lift unit 8 to swing the power lift arms 123 rearwardly. This causes the bell crank arm 125 to lower, whereupon the suction or forward and downward angle of the tools 35 causes them to enter the ground until the front end 44 of each of the lower link members 41 engages the laterally outturned portion of the associated beam 16. This limits the downward movement of the tools 35. The upper and lower link members 55 and 41 are, however, free to swing upwardly about the pivots 56 and 43 at any time. If, during operation, the front end or point of one of the tools 35 should strike an obstruction, such as the stone S' (Figure 2), the overload release unit 50 will trip, permitting the bottom 35 to swing in a clockwise direction (Figure 2) about its pivotal connection 36 with the lower end of the associated standard 37. When the plow bottom 35 swings about its pivot 36 at the lower end of the standard 37, the point is not forced into the ground, but instead, the link members 41 and 55 merely swing upwardly until the obstruction S' is passed. By virtue of the permissive upward movement of the links 41 and 55, there is no tendency for the movement of the tool 35 into its released position to raise the beam 16 and its associated gauge mechanism. It has already been pointed out above how the frictionally held pin or stud 84 may yield, to permit the associated beam 16 to swing about its longitudinal axis if the tool 35 should engage an obstruction at one side or the other, rather than directly on the point as indicated at S' in Figure 2. The amount of suction or downward angle of the tools 35 may be varied as desired or necessary by adjusting the lock nuts 57 on the upper link members 55, and the depth of operation of the tools may be adjusted as desired or necessary by changing the position of the set screw collars 31 and 32 on the associated gauge wheel spindles 27.

While we have shown and described above the preferred structure in which the principles of the present invention have been incorporated, it is to be understood that our invention is not to be limited to the particular details shown and described above, but that in fact, widely different means may be employed in the broader aspects of our invention.

What we claim, therefore, and desire to secure by Letters Patents is:

1. In a tractor mounted implement adapted to be connected to a tractor having a rear axle, the improvement comprising a bracket adapted to be disposed in a generally vertical transversely extending position, means for attaching said bracket to the axle of the tractor, said bracket having an opening in the lower portion thereof, a generally fore and aft extending beam having a rear end rockably disposed in said opening, an arm fixed to said beam and serving as an abutment by which forward motion of the tractor is transmitted to the rear end of said beam, a ground engaging tool fixed to said beam forward of said bracket and lying generally below said beam, the upper portion of said bracket having a transversely extending arcuate slot, the upper end of said arm having an opening, a stud disposed in said slot and opening, and means movably connecting said stud with the associated slotted portion of said bracket means whereby, when the ground engaging tool strikes an obstruction tending to shift the tool laterally, said beam is permitted to rock about its generally fore and aft extending axis by the yielding of said movable means.

2. The invention set forth in claim 1, further characterized by said stud being of such length as to accommodate fore and aft movement of the upper end of said arm relative thereto, whereby up and down movement of said beam relative to said bracket means is accommodated.

3. An agricultural implement adapted to be attached to a tractor, comprising a pair of generally laterally spaced fore and aft extending beams, a pair of ground working tools connected with said beams, respectively, in depending relation, draft transmitting bracket means attachable to the rear portion of the tractor and including means rockably receiving the rear ends, respectively, of said beams, a stud connected with the rear end of each of said beams, and means connected between each stud and the associated bracket portion for frictionally holding each stud against movement relative to the associated bracket means except upon the occurrence of an overload.

4. An implement as defined in claim 3, further characterized by means connected between each stud and the associated beam comprising an arm fixed to each beam and shiftably connected for fore-and-aft movement with the associated stud.

5. An agricultural implement adapted to be attached to a tractor, comprising a pair of generally laterally spaced fore-and-aft extending beams, ground engaging gauge means connected with the forward ends of said beams, a pair of ground working tools connected with said beams rearwardly of said ground engaging means and in depending relation to the two said beams, respectively, draft transmitting bracket means attachable to the rear portion of the tractor and including means rockably receiving the rear ends, respectively, of said beams, and a generally vertically extending portion connected with each beam-receiving means, an arm fixed to the rear portion of each beam adjacent the associated bracket means, a stud extending in a generally fore-and-aft direction between each arm and the associated vertically extending portion, one of said arm and portion being shiftable in a fore-and-aft direction relative to the stud and the other of said arm and associated portion frictionally receiving said stud for lateral movement.

6. An agricultural implement adapted to be attached to a tractor, comprising a fore-and-aft extending beam, ground engaging gauge means connected with the forward end of said beam, a ground working tool connected with said beam rearwardly of said ground engaging means and in depending relation to said beam, draft transmitting bracket means attachable to the rear portion of the tractor and including means receiving the rear end of said beam means connecting the rear portion of said beam with said draft-transmitting bracket for accommodating up and down swinging of the associated beam relative thereto but preventing rotation of said beam about a generally longitudinally extending axis, and overload release means connected with said last mentioned connecting means to provide for movement of said beam about said longitudinal axis in the event that said ground working tool is forced generally laterally by an obstruction or the like.

References Cited in the file of this patent

UNITED STATES PATENTS

| | | |
|---|---|---|
| 246,598 | Casaday | Sept. 6, 1881 |
| 1,318,036 | Wakefield | Oct. 7, 1919 |
| 1,774,007 | Hester | Aug. 26, 1930 |
| 2,151,270 | Hamill | Mar. 31, 1939 |
| 2,672,803 | Silver et al. | Mar. 23, 1954 |
| 2,679,791 | Carney | June 1, 1954 |
| 2,685,241 | Silver et al. | Aug. 3, 1954 |